US009156331B2

(12) United States Patent
Murakami et al.

(10) Patent No.: US 9,156,331 B2
(45) Date of Patent: Oct. 13, 2015

(54) AIR-COOLED FUEL CELL VEHICLE

(75) Inventors: Takanori Murakami, Shizuoka-ken (JP); Shiro Matsumoto, Shizuoka-ken (JP); Tohru Ohta, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 405 days.

(21) Appl. No.: 13/701,977

(22) PCT Filed: Jun. 6, 2011

(86) PCT No.: PCT/JP2011/062885
§ 371 (c)(1), (2), (4) Date: Dec. 4, 2012

(87) PCT Pub. No.: WO2012/014568
PCT Pub. Date: Feb. 2, 2012

(65) Prior Publication Data
US 2013/0139997 A1 Jun. 6, 2013

(30) Foreign Application Priority Data
Jul. 26, 2010 (JP) ................................ 2010-166833

(51) Int. Cl.
*B60H 1/00* (2006.01)
*B60K 11/06* (2006.01)
(Continued)

(52) U.S. Cl.
CPC ............ *B60H 1/00278* (2013.01); *B60K 11/06* (2013.01); *B60L 1/003* (2013.01); *B60L 1/02* (2013.01); *B60L 3/0053* (2013.01); *B60L 11/1892* (2013.01); *B60L 11/1896* (2013.01); *B60L 11/1898* (2013.01); *H01M 8/04067* (2013.01); *B60K 11/04* (2013.01); *B60K 2001/001* (2013.01); *B60K 2001/0411* (2013.01);
(Continued)

(58) Field of Classification Search
None
See application file for complete search history.

(56) References Cited

U.S. PATENT DOCUMENTS

2005/0170223 A1 8/2005 Okazaki
2007/0122669 A1 5/2007 Kusano et al.
(Continued)

FOREIGN PATENT DOCUMENTS

CN 1914057 A 2/2007
CN 2879439 Y 3/2007
(Continued)

OTHER PUBLICATIONS

International Search Report corresponding to International Application No. PCT/JP2011/062885 mailed Aug. 9, 2011.
(Continued)

*Primary Examiner* — S. Joseph Morano
*Assistant Examiner* — Hilary L. Johns
(74) *Attorney, Agent, or Firm* — Myers Bigel Sibley & Sajovec, P.A.

(57) ABSTRACT

The cooling performance on an air-cooled fuel cell and a radiator for cooling electrical equipment is improved in an air-cooled fuel cell vehicle. The air-cooled fuel cell includes: air inlets respectively at both side portions in a vehicle width direction; and air outlets and an exhaust duct at a central portion in the vehicle width direction, the exhaust duct configured to discharge air flowing out of the air outlets to a rear side of the vehicle. Intake ducts extending toward the front portion of the vehicle are respectively connected to the air inlets. Air intake ports of the intake ducts are respectively opened at both side portions, in the vehicle width direction, of a radiator and at positions closer to the front portion of the vehicle than the radiator.

4 Claims, 4 Drawing Sheets

: AIR
: EXHAUST
: COOLING AIR
FRONT
LEFT
1 2 4R 4L 5R 5L 6R 6L 7 12R 12L 14R 14L 26 27R 27L 28R 28L 29 30 31R 31L 32R 32L 33R 33L 35R 35L 36R 36L 37R 37L 38 39

(51) Int. Cl.

| | |
|---|---|
| ***B60L 1/00*** | (2006.01) |
| ***B60L 1/02*** | (2006.01) |
| ***B60L 3/00*** | (2006.01) |
| ***B60L 11/18*** | (2006.01) |
| ***H01M 8/04*** | (2006.01) |
| *H01M 8/10* | (2006.01) |
| *B60K 11/04* | (2006.01) |
| *B60K 1/00* | (2006.01) |
| *B60K 1/04* | (2006.01) |

(52) U.S. Cl.

CPC .......... *B60L 2240/34* (2013.01); *B60L 2240/36* (2013.01); *H01M 2008/1095* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

| | | | | |
|---|---|---|---|---|
| 2007/0154757 | A1 * | 7/2007 | Okazaki | 429/26 |
| 2009/0025989 | A1 | 1/2009 | Takaku et al. | |
| 2009/0266508 | A1 | 10/2009 | Furuta | |
| 2011/0129741 | A1 | 6/2011 | Kusano et al. | |

FOREIGN PATENT DOCUMENTS

| | | | |
|---|---|---|---|
| DE | 112004001832 | T2 | 7/2006 |
| JP | 2004-022190 | A | 1/2004 |
| JP | 2005-190727 | | 7/2005 |
| JP | 2005-216783 | | 8/2005 |
| JP | 2006-240475 | | 9/2006 |
| JP | 2009-078623 | | 4/2009 |

OTHER PUBLICATIONS

Office Action corresponding to Chinese Application No. 201180030372.3 issued Dec. 12, 2014.

Office Action corresponding to German Application No. 112011102498.3 issued Sep. 9, 2014.

* cited by examiner

101
RADIATOR
114
ADJUSTMENT VALVE
115
HEATER
HEATER CORE
116
BLOWER FAN
117
AIR
WATER PUMP
113
112
EXHAUST
BACK PRESSURE VALVE
108
STEAM SEPARATOR
107
FUEL CELL
104
COMPRESSOR
106
FILTER
105
AIR
PURGE VALVE
110
STEAM SEPARATOR
109
HYDROGEN PUMP
111
PRESSURE REDUCING VALVE
103
HYDROGEN TANK
102
AIR
HYDROGEN
COOLING WATER

AIR-COOLED FUEL CELL VEHICLE

RELATED APPLICATIONS

This application is a 35 U.S.C. §371 national stage application of PCT Application No. PCT/JP2011/062885, filed on Jun. 6, 2011, which claims priority from Japanese Application No. 2010-166833 filed Jul. 26, 2010, the contents of which are incorporated herein by reference in their entireties. The above-referenced PCT International Application was published as International Publication No. WO 2012/014568 A1 on Feb. 2, 2012.

TECHNICAL FIELD

This invention relates to an air-cooled fuel cell vehicle. In particular, the invention relates to an air-cooled fuel cell vehicle in which a radiator and an air-cooled fuel cell stack are laid out.

BACKGROUND ART

An air-cooled fuel cell vehicle which uses a low-pressure blower fan and utilizes the same air for reaction and cooling, needs large intake and exhaust sections of an air-cooled fuel cell stack in order to reduce pumping loss and supply sufficient air.

As an electric vehicle, the air-cooled fuel cell vehicle needs a radiator which radiates heat of approximately 60 degrees C. to 70 degrees C. to cool electrical components such as a motor. Nevertheless, in an air-cooled fuel cell vehicle which drives at a relatively low temperature, air warmed up by a radiator which is disposed in a space of a vehicle front portion surrounded by a vehicle body panel, cannot provide a temperature difference, so that the cooling efficiency is significantly decreased, and the air cannot be used as air to a fuel cell stack. Accordingly, it is necessary to provide a thermal insulation structure superior to that for an internal combustion engine vehicle.

CITATION LIST

Patent Literature

[PTL 1] Japanese Patent Application Laid-open No. 2005-216783

A method for operating a vehicle-mounted fuel cell stack according to PTL 1 includes the steps of: measuring the temperature of power generating cells; and, when the measured temperature is equal to or lower than a preset standard operating temperature of the power generating cells, performing control so that no cooling air is distributed thereto by an air distribution mechanism.

SUMMARY OF INVENTION

Technical Problem

Furthermore, for an internal combustion engine vehicle, conventionally, numerous techniques exist as to a relative layout of an intake section for combustion and cooling and a heat exchanger such as a radiator or an air conditioner (A/C) capacitor. However, no corresponding technique has been found for an air-cooled fuel cell vehicle.

In a water-cooled fuel cell system 101 of a water-cooled fuel cell vehicle, as shown in FIG. 6, in general, hydrogen gas that is compressed and stored in a high-pressure hydrogen tank 102 is introduced into an anode intake section of a water-cooled fuel cell stack 104 via a pressure reducing valve 103 while air sucked through a filter 105 is compressed by a compressor 106 and is then introduced into a cathode intake section of the water-cooled fuel cell stack 104. Thereby, the water-cooled fuel cell stack 104 generates electric power. Cathode exhaust discharged from a cathode exhaust section of the water-cooled fuel cell stack 104 is emitted to the outside air via a back pressure valve 108 for controlling the pressure of the cathode system, after water in the exhaust is partially separated by a steam separator 107. Furthermore, anode exhaust from the water-cooled fuel cell stack 104 also similarly passes through a steam separator 109, and the anode exhaust is mixed into the cathode exhaust through a purge valve 110. A flow amount of purged hydrogen discharged from the anode is sufficiently smaller than the amount discharged from the cathode exhaust. Accordingly, purged hydrogen from the anode can be emitted to the outside air with the cathode exhaust in a quantity of not greater than 4% that is the lowest combustible concentration. Meanwhile, to improve hydrogen utility, the anode exhaust is recirculated to the anode intake section of the water-cooled fuel cell stack 104 by use of a hydrogen pump 111.

Next, a cooling system 112 of the water-cooled fuel cell system 101 will be described.

A cooling loop of the cooling system 112 includes a water pump 113 configured to transport cooling water with pressure and arranged in front of or behind the water-cooled fuel cell stack 104. The cooling water having cooled the water-cooled fuel cell stack 104, exchanges heat with the atmosphere in a radiator 114, and the cooling water is then returned to the water-cooled fuel cell stack 104 again. Additionally, the cooling loop includes a heater core 116 configured to heat the vehicle compartment and arranged in parallel to the radiator 114 with an adjustment valve 115 in between. When heating is necessary, the adjustment valve 115 is opened to thereby supply high-temperature cooling water to the heater core 116, and a blower fan 117 for blowing wind is driven for the heating. Nevertheless, the amount of waste heat from the water-cooled fuel cell stack 104 is considerably smaller than that of an internal combustion engine. Therefore, in general, another heat source such as an electric heater is additionally used in combination.

As described above, the water-cooled fuel cell system 101 includes a large number of accessories such as the compressor 106 for compressing introduced air to improve the power density of the water-cooled fuel cell stack 104. This causes inconvenience in that the system is complex, large, heavy, and high in cost.

In contrast, in an air-cooled fuel cell system which uses air as a reacting gas and also as a cooling medium, a fuel cell stack can be cooled with air, and the air can be supplied to the fuel cell stack using a low-pressure blower fan. Accordingly, the system can be simplified in comparison with a water-cooled fuel cell system. However, since a radiator for cooling electrical equipment and the like is disposed at a front portion of the vehicle, consideration must be given such that air in which temperature has been increased by cooling such a radiator should not be drawn into an intake duct.

Accordingly, an object of this invention is to provide an air-cooled fuel cell vehicle improving the cooling performance in an air-cooled fuel cell stack and a radiator for cooling electrical equipment.

Solution to Problem

The invention provides an air-cooled fuel cell vehicle including: a radiator disposed in a space of a vehicle front portion surrounded by a vehicle body panel from an upper portion of the radiator and both side portions, in a vehicle width direction, of the radiator, the radiator configured to cool electrical equipment; and an air-cooled fuel cell stack disposed behind the radiator, and configured to use air as a reacting gas and also as a cooling medium; wherein the air-cooled fuel cell stack includes: air inlets respectively at both side portions, in the vehicle width direction, of the air-cooled fuel cell stack; and air outlets and an exhaust duct at a central portion, in the vehicle width direction, of the air-cooled fuel cell stack; wherein the exhaust duct configured to discharge air flowing out of the air outlets to a rear side portion of the vehicle; wherein intake ducts extending toward a front portion of the vehicle are respectively connected to the air inlets; and wherein air intake ports of the intake ducts are respectively opened at the both side portions, in the vehicle width direction, of the radiator and at positions closer to the front portion of the vehicle than the radiator.

Advantageous Effects of Invention

The air-cooled fuel cell vehicle of this invention is capable of improving the cooling performance on an air-cooled fuel cell stack and a radiator for cooling electrical equipment.

DESCRIPTION OF EMBODIMENTS

This invention achieves the object of improving the cooling performance on an air-cooled fuel cell stack and a radiator for cooling electrical equipment by eliminating accessories, such as a compressor, as many as possible to simplify a system.

Embodiment

FIGS. 1 to 5 illustrate an Embodiment of the present invention.

Figure 1:
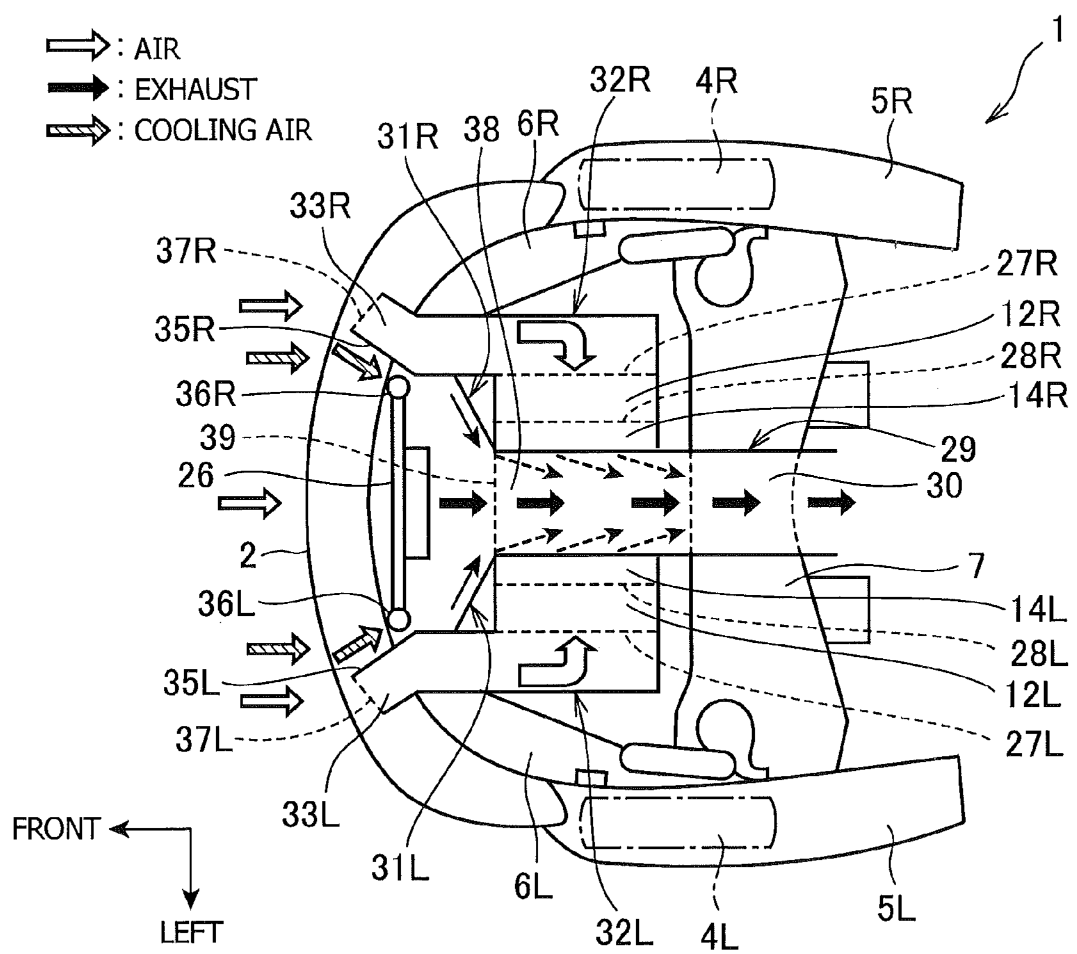
FIG. 1 is a plan view of a vehicle front portion. (Embodiment)
Figure 2:
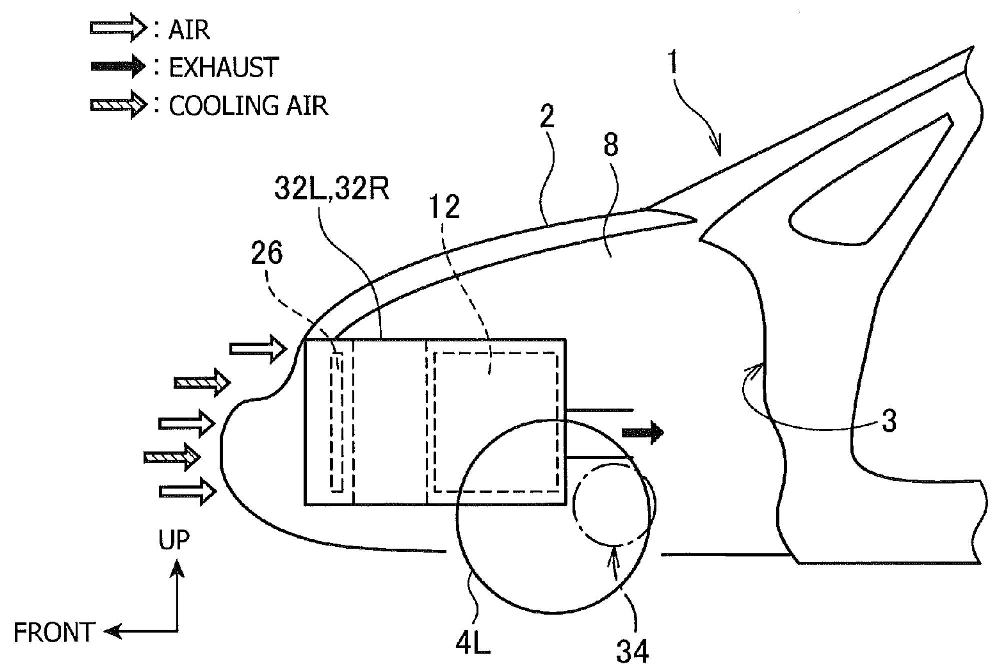
FIG. 2 is a left side view of the vehicle front portion. (Embodiment)

In FIGS. 1 and 2, reference numeral "1" denotes an air-cooled fuel cell vehicle; reference numeral "2" denotes a vehicle body panel (front hood); reference numeral "3" denotes a dashboard; reference numeral "4L" denotes a left front wheel; reference numeral "4R" denotes a right front wheel; reference numeral "5L" denotes a left fender; reference numeral "5R" denotes a right fender; reference numeral "6L" denotes a left side panel; reference numeral "6R" denotes a right side panel; and reference numeral "7" denotes a front cross member. The vehicle body panel 2 forms a space 8 by surrounding a vehicle front portion from the above and two sides in a vehicle width direction (vehicle lateral direction) Y, which is orthogonal to a vehicle longitudinal direction X.

The air-cooled fuel cell vehicle 1 includes an air-cooled fuel cell system 9 installed in the aforementioned space 8.

Figure 5:
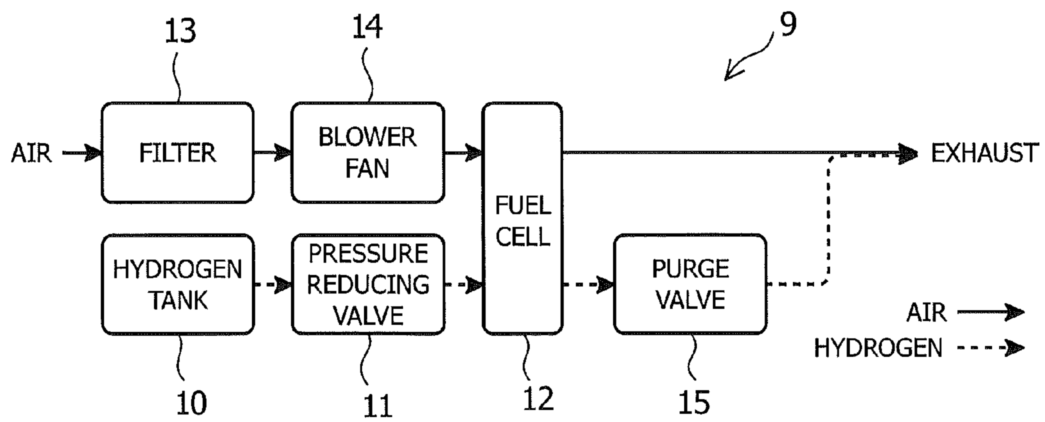
FIG. 5 is a configuration diagram of an air-cooled fuel cell system. (Embodiment)
Figure 6:
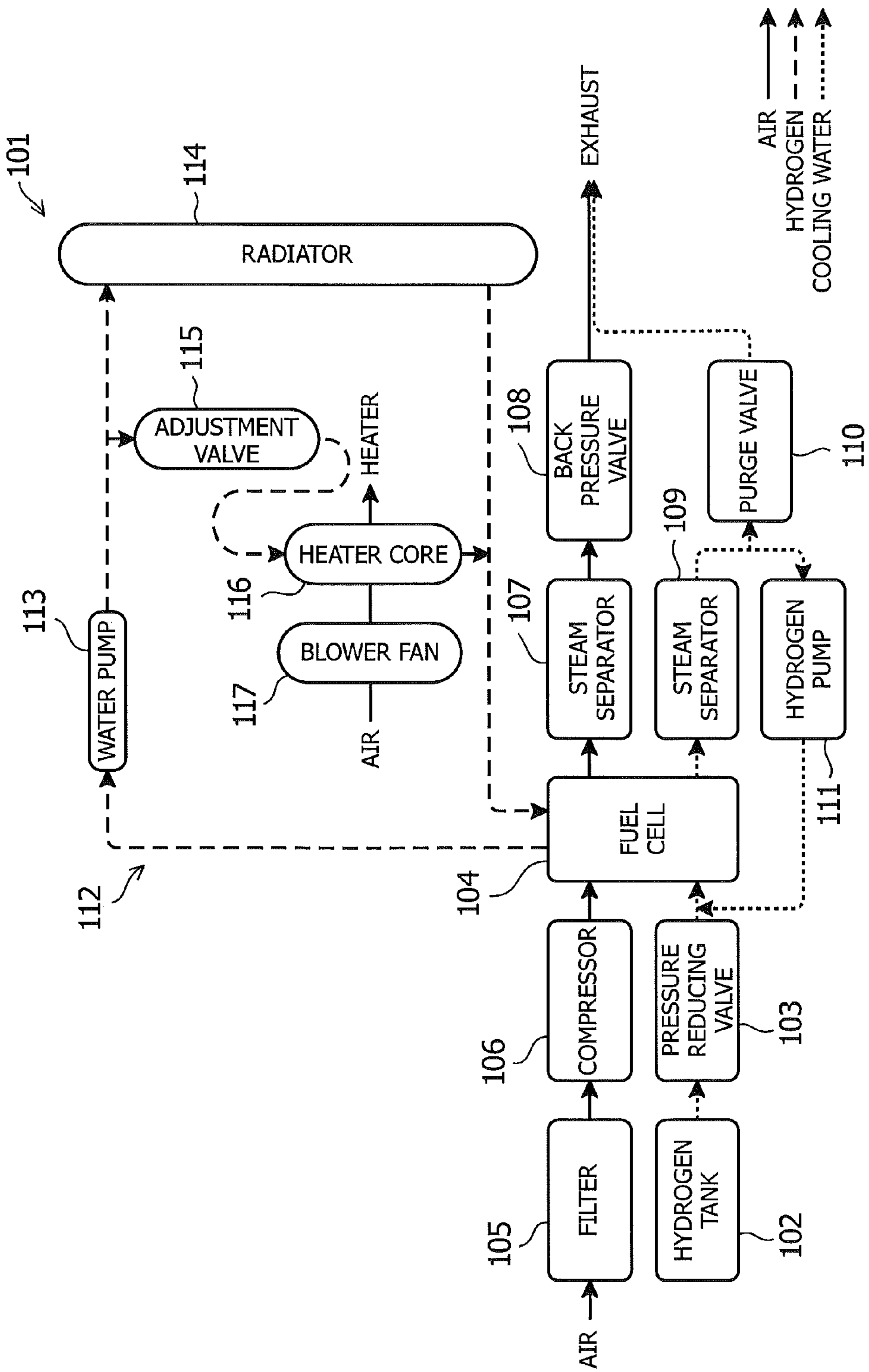
FIG. 6 is a configuration diagram of a water-cooled fuel cell system. (Conventional Example)

As shown in FIG. 5, in the air-cooled fuel cell system 9, after the pressure of a hydrogen gas compressed and stored in a high-pressure hydrogen tank 10 is reduced by a pressure reducing valve 11, the hydrogen gas is introduced into an anode intake section of an air-cooled fuel cell stack 12. In general, the air-cooled fuel cell system 9 does not have a compressor for compression at high pressure in a passage for supplying air to a cathode intake section, but air sucked through a filter 13 is supplied to the air-cooled fuel cell stack 12 by using a low-pressure blower fan 14. The air supplied to the air-cooled fuel cell stack 12 is not only used for a power generation reaction in the air-cooled fuel cell stack 12, but also plays a role in cooling the air-cooled fuel cell stack 12 by removing waste heat from the air-cooled fuel cell stack 12. Anode exhaust from the air-cooled fuel cell stack 12 is sent via a purge valve 15 and is mixed with cathode exhaust from the air-cooled fuel cell stack 12. When purging is performed on the anode side, the exhaust hydrogen gas is diluted with the cathode side exhaust to the lowest combustible concentration or lower, and emitted to the outside.

In the air-cooled fuel cell system 9, an electrochemical reaction takes place, and water is generated accompanying the reaction. The air-cooled fuel cell stack 12 is normally constituted of a large number of minimum constituent units, called cells, stacked on one another.

Figure 4:
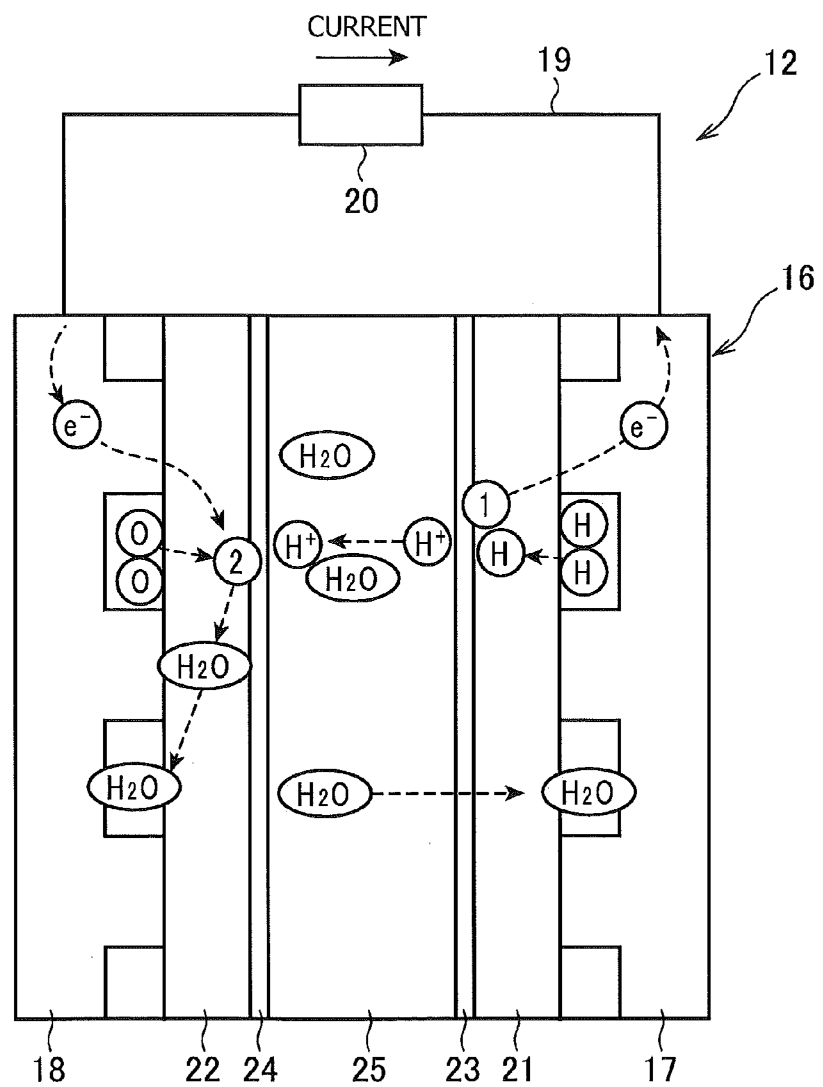
FIG. 4 is a cross-sectional view of a cell of the air-cooled fuel cell stack. (Embodiment)

As shown in FIG. 4, in each of cells 16 in the air-cooled fuel cell stack 12 of a normal polymer electrolyte type, an anode electrode 17 and a cathode electrode 18, which respectively supply hydrogen and air (oxygen), are connected to each other with a current line 19. An electric load 20 is disposed in the middle of the current line 19. Furthermore, disposed between the anode electrode 17 and the cathode electrode 18 are: an anode-side diffusion layer 21 and a cathode-side diffusion layer 22; an anode-side catalyst layer 23 and a cathode-side catalyst layer 24 for reaction activation; and an electrolyte membrane 25 at a central position through which hydrogen ions permeate selectively.

Thus, hydrogen molecules (H) supplied to the anode electrode 17 become active hydrogen atoms in the anode side catalyst layer 23, located on the surface of the electrolyte membrane 25, of the anode electrode 17, which then become hydrogen ions ($H^+$), emitting electrons.

The reaction indicated by "1" in FIG. 4 is represented by the following formula (1).

$$H_2 \rightarrow 2H^+ + 2e^- \quad (1)$$

The hydrogen ions ($H^+$) generated according to the formula (1) move in the electrolyte membrane 25 from the anode electrode 17 side to the cathode electrode 18 side together with water in the electrolyte membrane 25. The electrons ($e^-$) move to the cathode electrode 18 through an external circuit. On the other hand, oxygen molecules (O) in air supplied to the cathode electrode 18 receive the electrons ($e^-$) supplied from the external circuit in the cathode side catalyst layer 24, and thus become oxygen ions, which are combined with the hydrogen ions ($H^+$) coming through the electrolyte membrane 25 to form water ($H_2O$).

The reaction indicated by "2" in FIG. 4 is represented by the following formula (2).

$$\tfrac{1}{2} \times O_2 + 2H^+ + 2e^- \rightarrow H_2O \quad (2)$$

Part of the water ($H_2O$) generated according to the formula (2) moves from the cathode electrode 18 to the anode electrode 17 because of concentration diffusion.

In the above-described chemical reaction, various losses are incurred inside the air-cooled fuel cell stack 12, such as resistance overpotential attributable to the electric resistances of the electrolyte membrane 25 and the electrodes; activation overpotential due to the electrochemical reaction caused by hydrogen and oxygen; and diffusion overpotential due to movements of hydrogen and oxygen in the anode-side diffusion layer 21 and the cathode-side diffusion layer 22. Therefore, waste heat generated due to the losses needs to be cooled.

The air-cooled fuel cell system 9 does not require a dedicated heat exchanger to cool the air-cooled fuel cell stack 12. However, as an electric vehicle, cooling electrical components such as a motor requires a radiator 26 to be described later, which radiates heat of 60 degrees C. to 70 degrees C.

In the air-cooled fuel cell vehicle 1 in which the air-cooled fuel cell stack 12 is mounted in the space 8 of the vehicle front portion, it should be avoided that the air-cooled fuel cell stack 12 absorbs waste heat from the radiator 26.

For this reason, in this Embodiment, the air-cooled fuel cell vehicle 1 in which the air-cooled fuel cell stack 12 is mounted in the space 8 has such a layout that intake sections of the air-cooled fuel cell stack 12 are disposed on the left and right of the radiator 26 to thus avoid sending waste heat from the radiator 26 to the intake sections of the air-cooled fuel cell stack 12. That is to say, since air supplied to the air-cooled fuel cell stack 12 is used not only for the power generation reaction but also for cooling of the air-cooled fuel cell stack 12, the layout is designed not to draw warmed air from the radiator 26.

Hereinafter, the layout of components such as the air-cooled fuel cell stack 12 at the vehicle front portion will be described in detail.

As shown in FIGS. 1 and 2, the radiator 26 configured to cool electrical equipment is disposed in the space 8 formed by the vehicle body panel 2. The radiator 26 is disposed at a central portion in the vehicle width direction Y on the front side of the vehicle front portion in such a manner as to extend in the vehicle width direction Y. The air-cooled fuel cell stack 12, which uses air as a reacting gas and also as a cooling medium, is disposed behind the radiator 26.

The air-cooled fuel cell stack 12 includes a left fuel cell stack 12L and a right fuel cell stack 12R respectively located on two side portions of the central portion in the vehicle width direction Y.

The left fuel cell stack 12L and the right fuel cell stack 12R respectively include: a left air inlet 27L and a right air inlet 27R as air inlets at the two side portions in the vehicle width direction Y; and a left air outlet 28L and a right air outlet 28R at the central portion in the vehicle width direction Y. Furthermore, a left blower fan 14L and a right blower fan 14R are disposed as the low-pressure blower fan 14 respectively on sides, closer to the central portion in the vehicle width direction Y, of the left air outlet 28L and the right air outlet 28R.

The left fuel cell stack 12L and the right fuel cell stack 12R are provided with an exhaust duet 29 at the central portion in the vehicle width direction Y. The exhaust duct 29 extends along inner walls of the left blower fan 14L and the right blower fan 14R so that air flowing out of the left air outlet 28L and the right air outlet 28R can be discharged to the rear side of the vehicle. The exhaust duct 29 is disposed at an approximately central position in the air-cooled fuel cell stack 12 in front view. The exhaust duct 29 forms an exhaust passage 30 and protrudes rearward by a predetermined length from a rear end of the air-cooled fuel cell stack 12.

A left air guide 31L and a right air guide 31R are respectively disposed at vehicle-front sides of the left fuel cell stack 12L and the right fuel cell stack 12R. The left air guide 31L and the right air guide 31R are inclined in such a manner as to smoothly guide exhaust from the radiator 26 into the exhaust duct 29 at the central portion in the vehicle width direction Y.

A left intake duct 32L and a right intake duct 32R extending toward the front of the vehicle are respectively connected to the left air inlet 27L and the right air inlet 27R.

The left intake duct 32L and the right intake duct 32R respectively have a left air intake port 33L and a right air intake port 33R, which are opened at two sides of the radiator 26 in the vehicle width direction Y and at positions closer to the front of the vehicle than the radiator 26.

A motor 34 as electrical equipment is disposed at the rear of the left fuel cell stack 12L and the right fuel cell stack 12R and below the exhaust duct 29.

Such a layout as described above makes it possible to take in air from the left air inlet 27L and the right air inlet 27R on the two sides of the left fuel cell stack 12L and the right fuel cell stack 12R in the vehicle width direction Y, and to discharge all of the air having cooled the left fuel cell stack 12L and the right fuel cell stack 12R to the rear side of the vehicle at once from the left air outlet 28L and the right air outlet 28R at the central portion in the vehicle width direction Y of the left fuel cell stack 12L and the right fuel cell stack 12R. Thus, it is possible to provide a structure in which cool air passing by the two sides of the radiator 26 in the vehicle width direction Y is readily taken into the left fuel cell stack 12L and the right fuel cell stack 12R.

In addition, such a structure as described above of the left intake duct 32L and the right intake duct 32R makes it possible to increase the opening areas of the left air intake port 33L and the right air intake port 33R of the left intake duct 32L and the right intake duct 32R and decrease the bending of the left intake duct 32L and the right intake duct 32R, reducing the passage resistance. Thus, a larger amount of cool air, which has not cooled the radiator 26, can be supplied to the left fuel cell stack 12L and the right fuel cell stack 12R, improving the cooling performance on the left fuel cell stack 12L and the right fuel cell stack 12R.

The left air intake port 33L and the right air intake port 33R of the left intake duct 32L and the right intake duct 32R are arranged frontward of or side by side with the radiator 26. This makes it possible to prevent intake of air warmed up in the radiator 26.

In the exhaust system of the left fuel cell stack 12L and the right fuel cell stack 12R, the exhaust duct 29 is provided behind the radiator 26 as shown in FIGS. 1 and 2. Thus, this provides a structure in which warmed gas discharged from the radiator 26 does not stagnate and is discharged to the outside together with exhaust from the left fuel cell stack 12L and the right fuel cell stack 12R. Such a structure makes it possible to discharge exhaust heat from the radiator 26 to the outside of the vehicle without stagnation. Accordingly, the temperature increase in the space 8 can be suppressed. As a result, the temperature increase of the left fuel cell stack 12L and the right fuel cell stack 12R can be suppressed. Furthermore, during normal running, ram-air flows in, enabling the exhaust to be discharged smoothly.

As shown in FIG. 1, the left intake duct 32L and the right intake duct 32R respectively have a left inner-side external wall 35L and a right inner-side external wall 35R on inner sides in the vehicle width direction Y. The left inner-side external wall 35L and the right inner-side external wall 35R are respectively disposed along a left outer-side external wall 36L and a right outer-side external wall 36R of the radiator 26 on outer sides in the vehicle width direction Y and are inclined at a predetermined angle in such a manner as to spread outwardly in the vehicle width direction Y relative to the vehicle longitudinal direction X.

With such a structure, the left intake duct 32L and the right intake duct 32R make the left inner-side external wall 35L and the right inner-side external wall 35R on the inner sides in the vehicle width direction Y function as air guide portions for the radiator 26 to enable a larger amount of cooling air to be supplied to the radiator 26. This achieves improvement in the cooling performance on the radiator 26.

Specifically, travelling wind may pass by both left and right sides of the radiator 26 in such a manner as to avoid the radiator 26, which is high in wind resistance, and the cooling performance may thus be decreased. To suppress this phenomenon, in this Embodiment, the left air intake port 33L and the right air intake port 33R are directed to the outer sides of the vehicle to make the entire structure function as the air guide for the radiator 26.

The left intake duct 32L and the right intake duct 32R respectively include a left mesh cover 37L and a right mesh cover 37R for dust protection on the left air intake port 33L and the right air intake port 33R.

The presence of the left mesh cover 37L and the right mesh cover 37R can prevent foreign matter from entering the left fuel cell stack 12L and the right fuel cell stack 12R.

Figure 3:
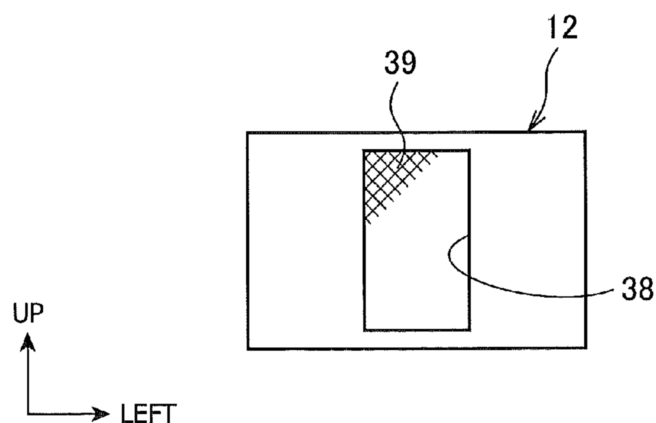
FIG. 3 is a front view of an air-cooled fuel cell stack. (Embodiment)

The exhaust duct 29 includes a radiator opening 38 which is opened toward the front of the vehicle, and into which air having passed through the radiator 26 flows. The radiator opening 38 includes a duct-side mesh cover 39 for dust protection, and is disposed approximately at the central position of the air-cooled fuel cell stack 12, in a front view, as shown in FIG. 3.

With such a structure of the exhaust duct 29, as shown in FIG. 1, air discharged from the left fuel cell stack 12L and the right fuel cell stack 12R and air having cooled the radiator 26 can be joined together without decreasing the flow speeds and can be smoothly discharged to the rear side of the vehicle from the left fuel cell stack 12L and the right fuel cell stack 12R, thereby improving the cooling performance on the left fuel cell stack 12L and the right fuel cell stack 12R, and the radiator 26.

INDUSTRIAL APPLICABILITY

The layout of the air-cooled fuel cell system according to this invention is applicable also to a water-cooled fuel cell system.

REFERENCE SIGNS LIST

1 Air-cooled fuel cell vehicle
2 Vehicle body panel
8 Space
9 Air-cooled fuel cell system
12 Air-cooled fuel cell stack
12L Left fuel cell stack
12R Right fuel cell stack
14 Blower fan
14L Left blower fan
14R Right blower fan
26 Radiator
27L Left air inlet
27R Right air inlet
28L Left air outlet
28R Right air outlet
29 Exhaust duct
31L Left air guide
31R Right air guide
32L Left intake duct
32R Right intake duct
33L Left air intake port
33R Right air intake port
34 Motor
35L Left inner-side external wall
35R Right inner-side external wall
36L Left outer-side external wall
36R Right outer-side external wall
37L Left mesh cover
37R Right mesh cover
38 Radiator opening

The invention claimed is:

1. An air-cooled fuel cell vehicle comprising:
an air-cooled fuel cell stack configured to use air as a reacting gas and also as a cooling medium; and
a radiator disposed in a space of a vehicle front portion surrounded by a vehicle body panel from an upper portion of the radiator and both side portions, in a vehicle width direction, of the radiator, the radiator configured to cool electrical equipment other than the air-cooled fuel cell stack; and
wherein the air-cooled fuel cell stack is disposed behind the radiator in the space of the vehicle front portion;
wherein the air-cooled fuel cell stack includes: air inlets respectively at both side portions, in the vehicle width direction, of the air-cooled fuel cell stack; and air outlets and an exhaust duct at a central portion, in the vehicle width direction, of the air-cooled fuel cell stack, the exhaust duct configured to discharge air flowing out of the air outlets to a rear side portion of the vehicle;
wherein intake ducts extending toward a front portion of the vehicle are respectively connected to the air inlets; and
wherein air intake ports of the intake ducts are respectively opened at both side portions, in the vehicle width direction, of the radiator, and at positions closer to the front portion of the vehicle than the radiator.

2. The air-cooled fuel cell vehicle according to claim 1, wherein
each of the intake ducts has an external wall on an inner side in the vehicle width direction, and
the external wall is disposed along an external wall of the radiator on an outer side portion in the vehicle width direction, and is inclined in such a manner as to spread outwardly in the vehicle width direction relative to a vehicle longitudinal direction.

3. The air-cooled fuel cell vehicle according to claim 1, wherein the intake duct includes a mesh cover for dust protection on the air intake port.

4. The air-cooled fuel cell vehicle according to claim 1, wherein
the exhaust duct includes a radiator opening,
the radiator opening is opened toward the front of the vehicle, and
air which has passed through the radiator, flows into the radiator opening.

* * * * *